(12) United States Patent
Manohar et al.

(10) Patent No.: US 7,564,809 B1
(45) Date of Patent: Jul. 21, 2009

(54) EVENT-SYNCHRONIZATION PROTOCOL FOR PARALLEL SIMULATION OF LARGE-SCALE WIRELESS NETWORKS

(75) Inventors: Rajit Manohar, Ithaca, NY (US); Clint Kelly, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 575 days.

(21) Appl. No.: 11/123,233

(22) Filed: May 6, 2005

Related U.S. Application Data

(60) Provisional application No. 60/568,259, filed on May 6, 2004.

(51) Int. Cl.
*H04B 7/00* (2006.01)
(52) U.S. Cl. .................................... 370/310
(58) Field of Classification Search ................ 370/241, 370/242, 245, 250–253, 310; 702/108, 121–126, 702/127, 186; 703/20–27
See application file for complete search history.

(56) References Cited

U.S. PATENT DOCUMENTS

| | | | | |
|---|---|---|---|---|
| 5,826,066 | A * | 10/1998 | Jardine et al. ............ | 713/400 |
| 6,134,514 | A * | 10/2000 | Liu et al. ................ | 703/17 |
| 6,845,352 | B1 * | 1/2005 | Wang .................... | 703/24 |
| 7,092,866 | B2 * | 8/2006 | Rokosz .................. | 703/17 |
| 7,246,054 | B2 * | 7/2007 | Szymanski et al. ........ | 703/17 |
| 2004/0102942 | A1 * | 5/2004 | Rhodes .................. | 703/13 |

OTHER PUBLICATIONS

A. Boukerche, S. K. Das, A. Fabbri, and O. Yildiz. Performance analysis of a parallel PCS network simulation. Proceedings of the 6th International Conference on High Performance Computing (HiPC'99), 1999.
K. M. Chandy and J. Misra. Asynchronous Distributed Simulation via a Sequence of Parallel Computations. Communications of the ACM 24, 11 (Nov. 1981), 198-205.
R. M. Fujimoto. Parallel discrete event simulation. Communications of the ACM, 33(10): 30-53, Oct. 1990.
David Jefferson. Virtual Time. ACM Transactions on Programming Languages and Systems, 7(3):404-425, Jul. 1985.
X. Zeng, R. Bagrodia, M. Gerla. GloMoSim: a Library for Parallel Simulation of Large-scale Wireless Networks. Proceedings of the 12th Workshop on Parallel and Distributed Simulations-PADS '98, Banff. Alberta.
Rajive Bagrodia, K. Mani Chandy, Jayadev Misra: A Message-Based Approach to Discrete-Event Simulation. IEEE Trans. Software Eng. 13(6): 654-665 (1987).
M. Liljenstam, R. Ronnengren, R. Ayani: MobSim++: Parallel Simulation of Personal Communication Networks. IEEE DS Online, 2(2): 1-34 pgs.(2001).

* cited by examiner

*Primary Examiner*—Dmitry Levitan
(74) *Attorney, Agent, or Firm*—Jones, Tullar & Cooper, P.C.

(57) ABSTRACT

An event synchronization protocol called time-based synchronization (TBS) is employed to control operation of a network simulation. In TBS, processors in the simulated network execute events based on comparisons between timestamps for each event and a value generated by a time tracking device in the processor. In this manner, event execution is not dependent on other processes in the network and the simulation can actually be carried out at speeds faster than real time. A multiprocessor network is specially designed to execute TBS-based simulations.

18 Claims, 4 Drawing Sheets

| Event | Time Since Previous Event |
|---|---|
| RadioBeginRx | n/a |
| RadioEndRxNoErrors | 496.0 |
| ExaminePacket | 0 |
| UpdateRoutingTables | 0 |
| CreateAck | 0 |
| SendAck | 0 |
| TransmitAckBegin | 10.0 |
| TransmitAckEnd | 248.0 |

FIG. 1

EVENT-SYNCHRONIZATION PROTOCOL FOR PARALLEL SIMULATION OF LARGE-SCALE WIRELESS NETWORKS

CROSS REFERENCE TO RELATED APPLICATIONS

This application claims priority under 35 U.S.C. 119(e) on U.S. Provisional Application No. 60/568,259, which was filed on May 6, 2004, and is hereby incorporated by reference.

GOVERNMENT SPONSORSHIP STATEMENT

This invention arose out of research sponsored by a United States Government Agency, the Office of Naval Research (ONR), under ONR Contract No. N00014-00-1-0564. The Government has certain rights in the invention.

This application is also related to a US patent application entitled Sensor-Network Processors Using Event-Driven Architecture, which is being filed concurrently herewith on May 6, 2005.

BACKGROUND OF THE INVENTION

1. Field of the Invention

The present invention relates in general to a conservative event-synchronization protocol, time-based synchronization, which is particularly suited for parallel discrete event simulation of mobile ad hoc wireless networks.

2. Description of the Background Art

A mobile ad hoc wireless network (MANET) is a collection of mobile wireless nodes that form a temporary network without any infrastructure or centralized control. Researchers typically cite three uses for MANETs: emergency situations, military operations, and sensor networks. MANETs used in such situations could conceivably contain several thousand nodes. Simulators that evaluate MANETs must therefore be capable of simulating large-scale networks. Researchers wishing to quickly simulate such networks typically use parallel discrete-event simulators (PDES). These simulators all use conservative event-synchronization protocols to ensure that they produce the same results as a sequential simulator would.

A parallel discrete-event simulator can be considered to be composed of N logical processes, $LP0; : : : ; LPN\_1$; which communicate by sending messages containing time-stamped events. Each logical process has the following components: (1) the state variables that correspond to the part of the simulated physical system that the LP represents, (2) a time-ordered event queue, and (3) a local clock whose value equals the timestamp of the LP's most-recently-executed event.

An LP in a simulation using a conservative event-synchronization protocol must obey the local causality constraint. If such an LP has an event with timestamp T at the head of its event queue, it cannot execute this event until it is sure that it will not later receive a message with a timestamp earlier than T. As an example, in a simulation using the known null-message protocol, an LP receives messages via incoming-message queues (one for each LP that can send messages to the LP in question). Each such queue has a "clock," which equals the timestamp of the last message that the destination LP removed from the queue. Because the messages sent on each queue are guaranteed to have non-decreasing timestamps, an LP will become sure that it can execute the event at the head of its event queue when the clocks of all of its incoming-message queues are later than or equal to T. To ensure progress, LPs send time-stamped null messages, which do not contain actual events, but instead contain an implicit promise that the senders will not send to the receivers any messages with timestamps earlier than the timestamps of the null messages.

A MANET simulator typically uses two events per node to model a wireless transmission. The first represents the beginning of the transmission, and the second represents the end of the transmission. Consider an example with three nodes, node A, node B, and node C, which are simulated by LPA, LPB and LPC. Say that node A transmits a packet at simulated time 5 µs. The packet will reach nodes B and C only after some time, called the propagation delay, has elapsed. Assume that the propagation delay from node A to node B is 2 µs, and from node A to node C is 3 µs. The simulator will use three events to simulate the beginning of the transmission of the packet: one for node A with timestamp 5 µs, one for node B with timestamp 5+2=7 µs, and one for node C timestamp 5+3=8 µs. In a parallel simulator, LPA will send the events for nodes B and C to LPB and LPC, respectively.

The second event at each node represents the end of the transmission. Say that the transmission of the packet lasts for 100 µs; LPA; LPB; and LPC will schedule transmission-ending events with timestamps 105 µs, 107 µs, and 108 µs, respectively. Each logical process schedules its transmission-ending event itself. Neither LPB nor LPC would receive a message from LPA telling it to simulate the end of the transmission. Instead, the initial messages contain fields indicating the duration of the simulated transmission.

In most MANET simulators, an LP performs the radio calculations for a given transmission, such as determining path loss and fading, when it executes the event representing the beginning of a transmission. If an LP executes an event representing the beginning of another transmission before simulating the end of the first transmission, then it must decide whether it should simulate a collision. This decision usually depends on the signal strengths of the two transmissions and some characteristics of the simulated receiver's radio.

A drawback to know MANET simulation protocols, such as the null-message protocol, is that the speed at which an LP can execute an event depends on the rate at which the LP receives messages from other LPs in the network. For small networks, such limitations are not particularly burdensome. However, for very large networks with hundreds or even thousands of nodes, such limitations can dramatically increase the amount of time necessary to run a network simulation.

SUMMARY OF THE INVENTION

The present invention relates in general to new conservative event synchronization protocol called time-based synchronization (TBS). In TBS, a time scale is employed to control operation of a network simulation such that the size of the network to be simulated is no longer a factor in determining the speed at which the simulation will run. Furthermore, the use of a TBS-based protocol enables the simulation to be carried out at speeds many times faster than real time, depending on the processor architecture used to run the simulation. With this protocol, very large MANETs, for example, can be simulated quickly.

The manner in which the TBS protocol works is as follows. An LP in a simulation using TBS becomes sure that it can execute an event when a timestamp of the event is less than the elapsed real time (or scaled version thereof) since the simulation began. In other words, if the simulation has been executing for time t, then an LP can execute the event when the event's timestamp T is less than the elapsed real time (or, in the case of scaled time, less than the elapsed real time multiplied by the time scale of the simulation). Note that, unlike an LP in a simulation using the null message protocol, an LP in a TBS-based simulation does not need to know which other LPs can send it messages. Moreover, an LP in a TBS-based simulation can determine whether an event is executable without waiting for information from other LPs. The ability of an LP to make this determination on its own is what allows TBS-based simulations to scale well and be unaffected by the number of LPs in the network being simulated.

Although the subject TBS protocol does not require a special processing system for operation, to take maximum advantage of the TBS protocol's speed capabilities, a special multiprocessor architecture has also been devised that can be used to implement the TBS simulation protocol. In this architecture, each LP of a network to be simulated has its own dedicated processor. In addition, 100 or more of the processors can be disposed on a single chip and interconnected with one another to form what is referred to as a network on a chip (NoC).

Each of the processors is specially designed to include a timer coprocessor (or is programmed to carry out the timer coprocessor function). In the preferred embodiment, the timer coprocessor contains a set of timestamp registers and an incrementer. The incrementer is simply a time tracking device that keeps track of the scaled version of the current time. Whenever the value in a timestamp register is equal to the value of the incrementer, a timestamp notification occurs. If the processor core is not currently executing an event, it will jump to a particular address, depending on which timestamp register produced the timestamp notification, and begin executing an event. If the processor core is busy executing another event, then the timer coprocessor will place a token representing the current timestamp notification in a notification FIFO queue. When the processor executes the event specified by the timestamp notification, it can determine the current simulated time by reading the value of the timestamp register that produced the timestamp notification. A host computer for the NoC determines the rate of each LP processor's incrementer at compile time. If, for example, the smallest unit of simulated time is 100 nanoseconds, and the time scale is equal to one, then the incrementer will increment itself once every 100 nanoseconds. Likewise, if the time scale is two, the incrementer will increment itself once every 50 nanoseconds.

BRIEF DESCRIPTION OF THE DRAWINGS

The various features and advantages of the invention will become apparent to those of skill in the art from the following description, taken with the accompanying drawings, in which:

FIG. 1 is a table illustrating a sequence of events that is typically carried out by a MANET simulator and show the typical duration of each event;

DETAILED DESCRIPTION OF THE PREFERRED EMBODIMENT

Figure 2:
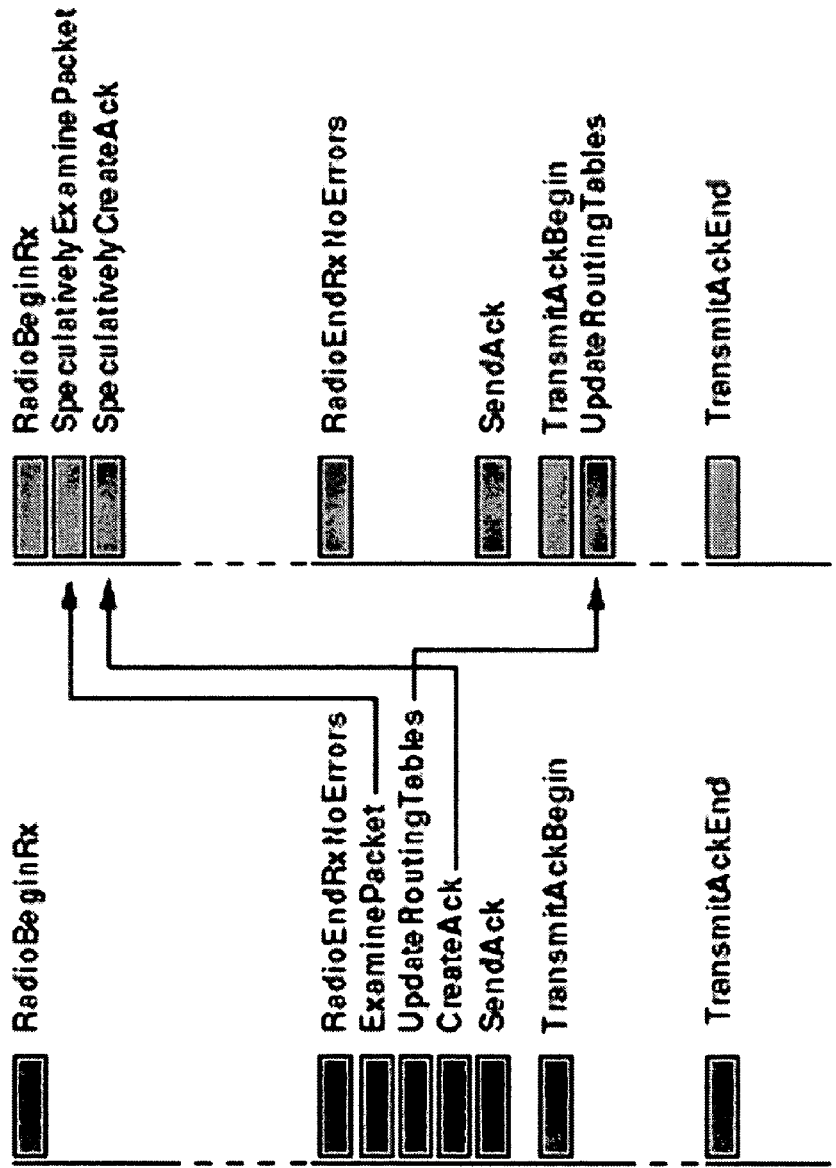
FIG. 2 is a schematic diagram showing how the sequence of events in the table of FIG. 2 can be rearranged for optimized performance of a simulation using the TBS-based synchronization scheme of the present invention.

The preferred embodiment of the invention comprises a TBS based sensor network simulation protocol and a network architecture for implementing the same. As discussed previously, a sensor network can be modeled with a number of LPs. An LP in a simulation using TBS becomes sure that it can execute a given event when the timestamp of the event is less than the scaled version of the elapsed real time since the simulation began. In other words, if the simulation has been executing for time t, then an LP can execute the event when the following inequality is true:

$$T < s \times t \tag{1}$$

where s is the time scale of the simulation (for the rest of the application, t will be used to represent the elapsed real time since a simulation began, and s to represent the time scale). When this inequality is true, then the event in question is said to be executable. It is easy to see that a parallel discrete event simulator (PDES) using TBS will execute correctly as long as every event arrives at its destination LP before it is executable. That is, an incoming message with timestamp T arriving at time t must satisfy Equation (2):

$$T \geq s \times t \tag{2}$$

Note that, unlike an LP in a simulation using the null message protocol, an LP in a TBS-based simulation does not need to know which other LPs can send it messages. Moreover, an LP in a TBS-based simulation can determine whether an event is executable without waiting for information from other LPs. The ability of an LP to make this determination on its own is what allows TBS-based simulations to scale well.

As an example, consider an LP that has the events $E_{10}$; $E_{12}$; $E_{20}$; and $E_{22}$ in its event queue, where the subscripts indicate the events' timestamps, in simulated µs. It is assumed that the LP requires 4 µs of real time to execute any event (this time corresponds to the time needed by whatever hardware is running the simulator). The logical process's clock, Clock; starts at zero. For simplicity, assume that s=1:

The event $E_{10}$ becomes executable when 10 µs<s×t. Because s=1, the LP will execute this event after 10 µs of real time have elapsed. Doing so takes 4 µs, after which, Clock=10 µs and t=14 µs. The LP can then immediately execute $E_{12}$, since it can be sure that no messages with timestamps less than 14 µs will arrive in the future. After executing this event, Clock=12 µs and t=18 µs.

Now imagine that a message containing an event $E_{21}$ arrives while the LP is executing $E_{12}$. The LP will place $E_{21}$, into its event queue after it executes $E_{12}$; wait until t=20 µs, and then execute $E_{20}$, $E_{21}$, and $E_{22}$.

Consider what happens if executing $E_{22}$ results in the transmission of an outgoing message, M, with timestamp $T_{msg}$. When the LP begins executing $E_{22}$, t=20 µs+2×4 µs=28 µs (since the LP must execute $E_{20}$ and $E_{21}$ before executing $E_{22}$). Therefore, M will arrive at its destination "on-time" (i.e., before it is executable) only if $$T_{msg} \geq 28 \text{ µs} + t_{comp} + t_{latency} \tag{3}$$

where $t_{comp}$ is the time spent on computation before the LP can send M (this computation is a fraction of the total computation involved in executing $E_{22}$), and $t_{latency}$ is the latency to send M to the destination LP. For a general time scale, this equation becomes $$T_{msg} \geq s \times (28 \text{ µs} + t_{comp} + t_{latency}) \tag{4}$$

A simulation designer can ensure that this inequality is true by decreasing the time scale.

From this example, two factors can be seen that can dramatically affect the performance of a TBS-based simulator. The first is the value of $t_{latency}$. Decreasing the latency to send a message between LPs enables a TBS-based simulator to use a higher time scale. The second factor is the ability of the LP to send its messages as early as possible. If, in the example, a programmer rewrote the simulator such that M was produced during the execution of $E_{21}$, instead of $E_{22}$; the 28 μs in Equation 4 would change to 24 μs, allowing the time scale to be increased. Another point to note is that an LP does not have to execute an event as soon as the event becomes executable. For instance, in the example the LP executes $E_{22}$ when the elapsed time is 28 μs, or 6 μs after $E_{22}$ becomes executable. Moreover, the difference between the simulation time, or Clock, of a particular LP, and the elapsed real time for the entire simulation should be noted. Remember that, for a logical process $LP_i$, $Clock_i$ is equal to the timestamp of LPi's most-recently-executed event. At any given real time, all of the LPs in a simulation can have different Clocks. On the other hand, the elapsed real time is a property of the entire simulation and is always equal for every LP. (It should be obvious that there will never exist a Clock that is greater than s×t).

Next suppose a node in the simulated MANET receives a data packet that contains some routing protocol information that it must use to update a table. Now suppose that the medium access control (MAC) protocol that the node is using dictates that the node must examine the data packet, wait for a 10 μs; and transmit an acknowledgment packet (ACK). The table in FIG. 1 shows such a sequence of events taken from an actual MANET simulation. When the LP executes SendAck it sends messages to the other LPs that simulate nodes receiving the ACK. (SendAck is analogous to $E_{22}$ in the previous example since the execution of each event leads to its LP sending messages.)

In a MANET simulation, the important point to note is that the events are not distributed evenly. Most of the computation (other than radio calculations) in MANET simulations occurs between events that correspond to the end of transmissions and the events that correspond to the beginning of new transmissions. However, the simulated time between two such events is much shorter than the simulated time between the beginning and end of a transmission. For example, the transmission of an incoming data packet and outgoing ACK take hundreds of μs, whereas most of the computations carried out by the processor only take on the order of 10 μs as illustrated in the table of FIG. 1.

This distribution of events may at first make TBS seem like a poor event-synchronization protocol to use for simulating MANETs. If the time scale is decreased such that 10 simulated μs scales to enough real time to do all of the necessary computation, then periods of hundreds of μs during which the LP is doing little computation will also scale, resulting in very long idle periods. Fortunately, by making a series of simple changes to the way in which a typical simulator executes events, relatively efficient TBS-based simulator can be created.

Initial simulations indicated that several critical paths limited the simulations' time scales. As stated earlier, the simulator will execute correctly if every message arrives at its destination before its enclosed event is executable. The critical paths are naturally the times between executing events that lead to one or more messages being sent, and the latest time by which these messages can arrive at their destination processors without violating Equation 2.

The inventors discovered that by changing the order in which the simulator executes events, the calculations could be moved of the critical paths. For the sequence of events in the table of FIG. 1, the critical path is the time between executing RadioEndRxNoErrors and the arrival at their destination LPs of the messages sent during the execution of SendAck. The left half of FIG. 2 shows the unoptimized time line for executing this sequence of events.

The first step in optimizing the way in which the simulator executes this sequence of events is to have the execution of ExaminePacket and CreateAck occur speculatively, after the execution of RadioBeginRx but before that of RadioEndRx-NoErrors. The conventional simulator executes these events after RadioEndRx-NoErrors to make sure that it will not receive any messages containing events corresponding to packets colliding with the original data packet. If such a simulated collision occurred, then the simulated data packet would have errors, the LP would execute RadioEndRxWithErrors, and it would merely simulate the receiving node dropping the packet. There would therefore be no ACK to simulate. In the subject TBS simulator, however, the processor will be idle for a long period of time between executing RadioBeginRx and RadioEndRxNoErrors. Therefore, if ExaminePacket and CreateAck are speculatively executed during this idle time and the LP eventually simulates a collision and the dropping of the packet, this speculative execution will not have cost any time (it will have cost some energy, however). On the other hand, if the LP does not simulate a collision, then the processor will have fewer events to execute before SendAck than it would have had before the TBS optimization. This makes the subject critical path shorter.

Likewise, the processor will be idle for a fairly long time after executing TransmitAckBegin. This period corresponds to the time spent simulating the transmission of the ACK. The execution of UpdateRoutingTables can be easily postponed to the time after TransmitAckBegin, since the content of the ACK does not depend on the updates to these tables. After TBS optimizations, the final sequence of events looks like the following: RadioBeginRx, SpeculativelyExaminePacket, SpeculativelyCreateAck, RadioEndRxNoErrors, SendAck, TransmitAckBegin, UpdateRoutingTables, TransmitAckEnd (see the right hand side of FIG. 2). The path is now at the point where the processor will be able to send the messages corresponding to the transmission of the ACK almost immediately after RadioEndRxNoErrors becomes executable.

This example demonstrates the two guidelines that are followed to optimize all paths. First, perform speculatively whatever computation may influence the next outgoing message. Second, postpone whatever computation is not necessary to form a given message to the time after sending the message, when the LP will be simulating the transmission of the packet that the message represents.

In order to determine the time scale s, Equation 2 is rewritten. If it is assumed that the event leading to the sending of messages is able to be executed as soon as it becomes executable, the constraint for correctness becomes:

$$\Delta T \geq s \times \Delta t \quad (5)$$

where $\Delta T$ is the difference between the timestamp of the current event and the timestamp of the final message sent as a result of executing this event, and $\Delta t$ is the real time between the event in question becoming executable and the first word of the last message reaching its destination. $\Delta T$ depends only upon the simulated MANET. It is the sum of the time, called the transmitter-turn-on time (TTOT), for a node's radio to change from sensing mode to transmitting mode, and the worst-case (longest) propagation delay between the sending node and one of the receiving nodes. These two times will be referred to as $T_{ttot}$ and $T_{prop}$.

$\Delta t$ depends on two factors: the time the NoC processor needs to execute the instructions that will send all of the messages into the interconnect, and the worst-case latency for the last message sent into the interconnect to reach its destination processor. The latter is a function of the NoC itself; this will be referred to it as $t_{lat}$. The former is essentially the product of the number of messages to be sent, the number of bytes per message, and the time required by the processor to send one byte into the interconnect.

One can perform one final optimization that eliminates the dependence of $\Delta t$ upon the length of messages. For each message a NoC processor would normally send, an additional reservation message is introduced, which contains only the timestamp of the original message (the original message will now be referred to as the full message). When a NoC processor simulates the transmission of a packet, it first sends reservation messages to all of the receiving processors, and then sends the full messages.

When an LP receives a reservation message, it knows that it will soon receive a full message, and so it does not execute any events with timestamps later than the reservation message's timestamp. This scheme ensures that all LPs will still execute events in order, while sending only reservation messages, which have minimal length, during the critical path. $\Delta t$ is said to be equal to $t_{lat}+t_{send} \times n$; where $t_{send}$ is the time for the processor to send one reservation message into the interconnect and n is the number of messages per simulated transmission. Using this expression, plus the equation for $\Delta T$; Equation 5 becomes $$T_{ttot}+T_{prop} \geq s \times (t_{lat}+t_{send} \times n) \quad (6)$$

which can be rewritten $$s \leq T_{ttot}+T_{prop}/t_{lat}+t_{send} \times n \quad (7)$$

The IEEE 802.11 MAC protocol specifies $T_{ttot}$ as 5 µs. If one takes a worst-case value for $T_{prop}$ of zero (since mobile nodes may be very close to one another) and for n of 32, and if $t_{send}$ is set to be 8 ns and $t_{lat}$ is set to be 100 ns, then the right-hand side of Equation 7 becomes approximately 14:0; meaning that the TBS simulator should be able to simulate MANETs with these parameters fourteen times faster than real time. Moreover, the execution time is independent of the size of the simulated MANET, as long as n remains constant.

Figure 3:
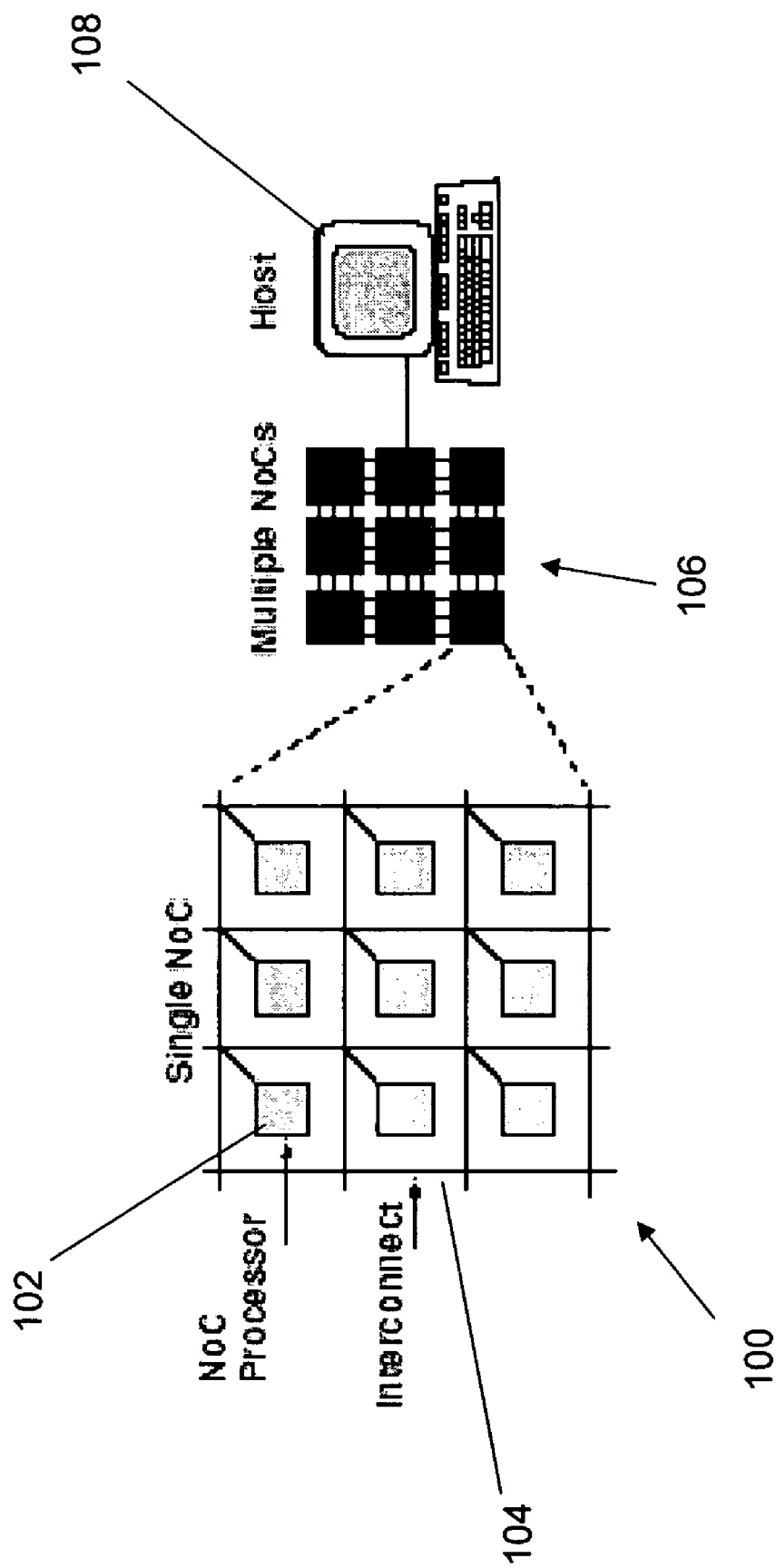
FIG. 3 is a multiprocessor system that employs one or more elements known as a Network on a Chip (NoC) that is specifically designed for executing a MANET simulation using the TBS-based synchronization protocol of the present invention.

Although the TBS-based simulation protocol of the subject invention could arguably be implemented on any simulation system, the inventors also devised a multiprocessor architecture that was specifically designed to implement the TBS-based simulation protocol and take full advantage of the protocol's speed capabilities. This system is illustrated in FIG. 3. A single chip system 100, referred to as a Network on a Chip (NoC), contains an array of processors 102, each of which is dedicated to a corresponding LP that forms part of a simulated network. The processors are interconnected by a web of interconnects 104. An array 106 of interconnected NoCs is also shown, the processors for which are controlled by a host computer system 108.

The use of the NoC 100 enhances the performance of the TBS simulator. There is a one-to-one mapping between simulated network nodes and LPs, and a one-to-one mapping between LPs and processors in the hardware executing the simulator. Therefore, a machine executing the TBS simulator should have thousands of processors. Moreover, because the performance of the TBS simulator depends heavily on the latency to pass messages between LPs, a machine is needed that allows processors to communicate efficiently. Currently-existing parallel platforms that a person would consider for running a TBS-based MANET simulator therefore include distributed shared-memory (DSM) machine and networks of workstations (NoWs). Unfortunately, the largest DSM machines contain only 1024 processors, making them incapable of running TBS-based simulations of MANETs containing greater than 1024 nodes. NoWs are more promising: NoWs containing more than 1024 nodes certainly exist, and the message-passing latency in a NoW can be as low as 6:3 µs. Unfortunately, however, a NoW is still a bad fit. TBS-based simulation of MANETs is an application with a large ratio of latency-critical communication to computation. Running such an application on a NoW containing thousands of very-powerful computers is a poor use of resources. The simulation's time scale, and therefore the performance of the simulator, will be limited by the latency to pass messages between workstations. Instead, a platform with less powerful computers but a lower message-passing latency would be preferred.

In addition to having thousands of moderately-powered processors that can communicate quickly, a machine that executes the subject TBS simulator should have processors that can efficiently manage event queues. To do this, the processors need a low-overhead mechanism for determining when an event has become executable. They must be able to quickly compare the timestamps of scheduled events with the scaled version of elapsed time.

With these requirements in mind, the NoC single chip multiprocessor was created. It is estimated that each chip will contain approximately 100 processors. To enable simulations of MANETs containing thousands of nodes, the NoC is designed such that one can gluelessly combine multiple chips to create a massively-parallel machine. The NoC processors are designed specifically to execute LPs in the TBS simulator, thus they lack virtual memory or any other hardware operating-system support. Each processor has its own private 8 KB memory, and communicates with the other processors only by passing messages via a highly-pipelined interconnect.

A simulation run on the NoC 100 is managed by the offchip workstation host 108. The host 108 can send and receive messages to and from the NoC processors 102; it sends the processors the code they will execute during a simulation and it collects statistics when a simulation is complete.

The NoC processors 102 lack multiply/divide and floating point units, meaning that they would require a great deal of time to perform complicated radio calculations. Therefore, instead of the NoC processors performing radio calculations during a simulation, the host performs the calculations before the simulation begins; it can do so for any simulation in which the movement patterns of the nodes are known before the simulation begins. The host 108 incorporates these calculations into the code that it sends to the processors 102 (the code for the radio layers has a section that is different for each processor; it tells a given processor how to simulate incoming transmissions based on the sources of the transmissions and the times at which they occur).

Because the processors 102 execute LPs, which in turn simulate network nodes, a processor that simulates a given network node will need to exchange messages only with processors simulating network nodes within its node's transmission range. Therefore, if the simulation user maps LPs to processors in an intelligent way (i.e. processors that are close together on a chip simulate nodes that are close together in the simulated terrain), no messages should travel more than a few hops through the interconnect 104. In simulations of networks with highly-mobile nodes, a mapping that is efficient at the beginning of a simulation may become quite inefficient later. Such simulations can be paused, re-mapped, and started again by the host. In simulations in which the mobility patterns of the nodes are known before the simulation begins, the host 108 can precompute the remappings. A researcher using the NoC 100 to simulate a network with high node mobility may wish to make remapping easier by using only a fraction of the NoC processors on each chip.

Figure 4:
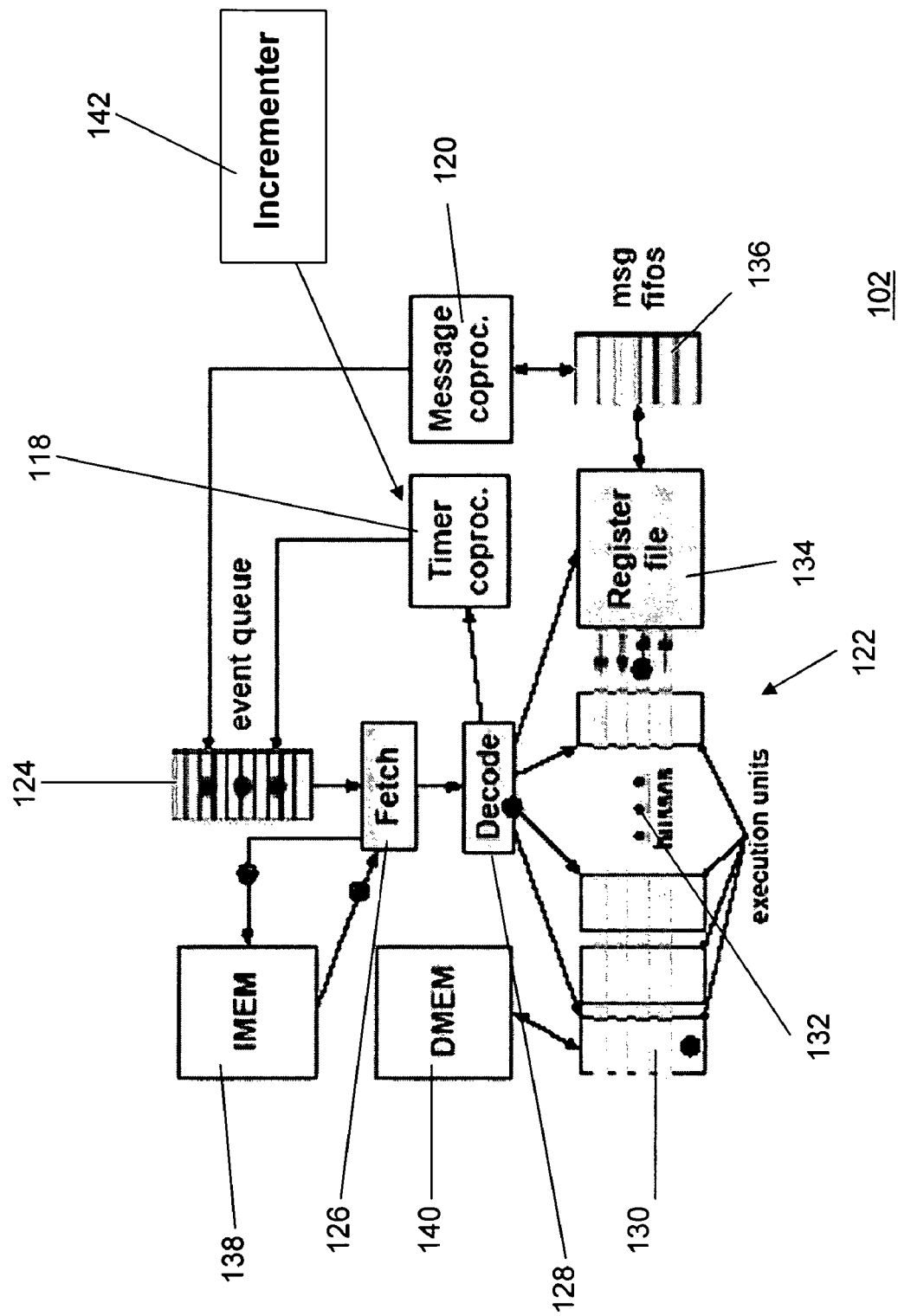
FIG. 4 is a block diagram of the elements that form one of the processors on a NoC.

FIG. 4 illustrates the details of a preferred embodiment of one of the chip processors 102. The processor 102 consists of three components: (1) a timer coprocessor 118, (2) a message coprocessor 120, which provides an interface to the interconnect web 104, and (3) a processor core 122, which consists of an event queue instruction fetch 126, decode 128, execution units 130, busses 132, register file 134, message FIFOs 136, and memories 138 and 140.

The most important of the processor elements in this application for implementing a TBS-based simulation protocol is the timer coprocessor 118, which it uses to schedule new events, and which alerts it when a previously scheduled event becomes executable. To determine when an event is executable, the timer coprocessors need to keep track of the current elapsed time; for this purpose, they each contain a time tracking device called an incrementer 142. All incrementers in the multiprocessor system start from zero on reset and change their values at the same rate. Thus, every processor in the system has the same notion of the current elapsed time.

Because all of the incrementers 142 advance independently (though at the same rate), there is no centralized control governing all of the processors in the NoC. Hence, adding more nodes to the simulated MANET, and therefore more processors to the TBS simulator, does not add any extra hardware synchronization costs. This ability of the hardware to scale well makes possible the fast simulation of large-scale MANETs.

The incrementer 142 essentially tracks real time. The rest of the timer coprocessor 118 must be fast enough to keep up with the rate at which the incrementer 142 changes. Every timestamp register must be compared against the incrementer 142 every time the incrementer's value changes. The software running on the processor 102 can adjust the time scale of the simulation by taking different samples of the incrementer 142. Shifting the sample one bit to the left corresponds to doubling the time scale. To schedule an event, the software uses an instruction to set a timestamp register to the timestamp of the event it wishes to schedule. The ISA also includes instructions that turn off timestamp registers (cancel events).

Although the timer coprocessor 118 must compare every timestamp register against the value of the incrementer 142 every time the incrementer value changes, it does not have to finish the comparisons before the incrementer value changes again. The comparison process can be pipelined such that one set of comparisons (the comparisons between every timestamp register and one value of the incrementer) completes every cycle. The entire timer coprocessor 118 is highly-pipelined so that it can achieve throughput high enough to enable one comparison to complete every time the incrementer changes its value.

In summary, the TBS protocol of the present invention can simulate very large sensor networks quickly through use of an event execution time tracking technique that is independent from other processes in the network to be simulated. Each processor in the simulation keeps track of time independently of other processors in the simulation. The arrangement enables a network simulation to be carried out at speeds faster than real time.

Although the invention has been disclosed in terms of a preferred embodiment, it will be understood that numerous variations and modifications could be made thereto without departing from the scope of the invention as defined in the following claims.

What is claimed is:

1. A time-based method for running a parallel-discrete event simulation of an event-driven system comprising the steps of:

a) providing a plurality of processors each for simulating one or more logical processes (LPs) for said simulation, each said LP including:

an incrementer for keeping track of real time since a simulation begins, said incrementer being simultaneously reset with each incrementer of all other of said LPs at the beginning of a simulation and having a count value which is incremented each time a predetermined count interval passes, said count interval being the same for each of said LPs; and means for generating a scaled version of said incrementer count value to enable said simulation to operate at a scaled version of real time;

b) generating one or more event messages to be sent to one or more other of said LPs, each of which identifies an event to be executed by said one or more of said LPs during said simulation, each said event message having an associated timestamp value indicating a scaled value of real time at which said event can be executed;

c) periodically comparing timestamp values for every event message received by each of said LPs to a current value of said scaled version of said incrementer count value; and d) for any event message whose timestamp value is equal to or less than the current scaled version of the incrementer count value, enabling any of said LPs that have received said event message to execute an event associated with said event message.

2. The method of claim 1, wherein each of said processors simulates a single dedicated one of said LPs.

3. The method of claim 2, wherein said means for generating a scaled value of said incrementer count value for each of said LPs is controlled by a separate host processor that communicates with each LP.

4. The method of claim 1, wherein the speed of said simulation is optimized by increasing the scaled version of said incrementer count value to a level which causes execution of said simulation at a speed that is faster than real time but prevents receipt of any event messages by any of said LPs having timestamp values that are less than the scaled version of the LP's incrementer value at the time that the event message is received.

5. The method claim 1, wherein each said LPs is configured to optimize time efficiency in execution of a sequence of computations which are to be executed by one of said LPs in response to receipt of a current event message by first performing speculatively whatever computations may influence a next event message to be sent by said one of said LPs and second, by postponing whatever computation is not necessary to form said next event message until after said one of said LPs sends said next event message.

6. The method of claim 5, wherein for each event message to be sent to one or more of said LPs, a reservation message is sent to said one or more LPs before the event message is sent, said reservation message containing only the timestamp of the event message; and, when one or more of said LPs receives said reservation message, the one or more of said LPs will not execute any events with timestamps later than the timestamp of said reservation message to ensure that all LPs will execute events in order.

7. The method of claim 1, wherein each of said LPs includes a timer coprocessor comprising said incrementer and a plurality of timestamp registers, and when an event message is received by one of said LPs, the timestamp for said event message is stored in one of said timestamp registers in said one of said LPs and whenever the value of the timestamps in any of said timestamp registers is equal to the scaled value of the incrementer, a timestamp notification is generated which indicates that the event associated with said timestamp is ready to be executed by said one of said LPs.

8. The method of claim 7, wherein upon receipt of said timestamp notification, said LP executes said event corresponding to said timestamp unless the LP is currently executing another event, in which case, a token representing the current timestamp notification is placed in a notification queue so that said LP can execute said event at a later time.

9. A parallel-discrete event simulator comprising an array of processors, each for simulating one or more logical process (LPs), each of said LPs including:
    an incrementer for keeping track of real time since a simulation begins, said incrementer being simultaneously reset with each incrementer of all other of said LPs at the beginning of a simulation and having a count value which is incremented each time a predetermined count interval passes, said count interval being the same for each of said LPs;
    means for generating a scaled value of said incrementer count value so that said simulation can operate at a scaled version of real time;
    means for generating one or more event messages to be sent to one or more other of said LPs and executed thereby during said simulation, each said event message having an associated timestamp value indicating a scaled value of real time at which an associated with said event message can be executed;
    means for periodically comparing timestamp values for every event message received from one or more other of said LPs to a current value of said scaled value of said incrementer; and
    means for enabling said LP to execute any event message whose timestamp value is equal to or less than the current scaled incrementer value.

10. The parallel-discrete event simulator of claim 9, wherein each of said processors is dedicated to and implements a single one of said LPs.

11. The parallel-discrete event simulator of claim 10, wherein said means for generating a scaled value of said incrementer count value for each of said LPs is controlled by a separate host processor that communicates with each of said processors in said array.

12. The parallel-discrete event simulator of claim 11, wherein each of said processors functions only to receive messages from and send messages to other processors in said array; and, said host processor is programmed to manage a simulation by performing any necessary calculations before the simulation begins and incorporating said calculations into programming code that is sent to each of said processors in said array.

13. The parallel-discrete event simulator of claim 9, wherein the speed of said simulation is optimized by increasing the scaled value of said incrementer count value to a level which causes execution of said simulation at a speed that is faster than real time but prevents receipt of any event messages by any of said LPs having timestamp values that are less than the scaled value of the LP's incrementer value at the time that the event message is received.

14. The parallel-discrete event simulator claim 9, wherein each of said LPs is configured to optimize time efficiency in execution of a sequence of computations which are to be executed by one of said LPs in response to receipt of a current event message by first performing speculatively whatever computations may influence a next event message to be sent by said one of said LPs and second, by postponing whatever computation is not necessary to form said next event message until after said one of said LPs sends said next event message.

15. The parallel-discrete event simulator of claim 14, wherein for each event message to be sent to one or more of said LPs, a reservation message is sent to said one or more LPs before the event message is sent, said reservation message containing only the timestamp of the event message; and, when one or more of said LPs receives said reservation message, the one or more of said LPs will not execute any events with timestamps later than the timestamp of said reservation message to ensure that all LPs will execute events in order.

16. The parallel-discrete event simulator of claim 9, wherein each of said LP processors includes a timer coprocessor comprising said incrementer and a set of timestamp registers and when an event message is received by one of said LPs, the timestamp for said event is stored in one of said timestamp registers; and whenever the value in any of said timestamp registers is equal to the scaled value of the incrementer, said timer coprocessor generates a timestamp notification which indicates that the message associated with said timestamp is ready to be executed.

17. The parallel-discrete event simulator of claim 16, wherein upon receipt of said timestamp notification, said LP is programmed to execute said event corresponding to said timestamp unless the LP is currently executing another event, in which case, a token representing the current timestamp notification is placed in a notification queue so that said LP can execute said event at a later time.

18. The parallel-discrete event simulator of claim 9, wherein said array of processors is formed on one or more chips, with each chip containing 100 or more of said processors.

* * * * *